US011118133B2

(12) United States Patent
    Slade et al.

(10) Patent No.: US 11,118,133 B2
(45) Date of Patent: Sep. 14, 2021

(54) METHOD FOR UPGRADING LOW-VALUE AND WASTE FATS, OILS, AND GREASES

(71) Applicant: REG SYNTHETIC FUELS, LLC, Ames, IA (US)

(72) Inventors: David A. Slade, Ames, IA (US); Ramin Abhari, Bixby, OK (US); Martin Haverly, Ames, IA (US); Peter Z. Havlik, Tulsa, OK (US)

(73) Assignee: REG SYNTHETIC FUELS, LLC, Ames, IA (US)

( * ) Notice: Subject to any disclaimer, the term of this patent is extended or adjusted under 35 U.S.C. 154(b) by 25 days.

(21) Appl. No.: 16/399,728

(22) Filed: Apr. 30, 2019

(65) Prior Publication Data

US 2019/0338200 A1    Nov. 7, 2019

Related U.S. Application Data

(60) Provisional application No. 62/665,991, filed on May 2, 2018.

(51) Int. Cl.
    *C11B 3/06*    (2006.01)
    *C11B 3/10*    (2006.01)
    (Continued)

(52) U.S. Cl.
    CPC ............... *C11B 3/06* (2013.01); *C11B 3/001* (2013.01); *C11B 3/008* (2013.01); *C11B 3/04* (2013.01);
    (Continued)

(58) Field of Classification Search
    CPC ...... C11B 3/00; C11B 3/02; C11B 3/06; C11B 3/10; C11B 3/001; C11B 3/008; C11B 13/00; C11B 13/02; C11B 3/04
    See application file for complete search history.

(56) References Cited

U.S. PATENT DOCUMENTS 5,336,794 A * 8/1994 Pryor .................... C11B 3/10
                                                554/206
6,248,911 B1 * 6/2001 Canessa ................. C11B 3/10
                                                554/191
(Continued)

OTHER PUBLICATIONS

International Search Report and Written Opinion in International Application No. PCT/US2019/030034, dated Jul. 15, 2019 (13 pages).

*Primary Examiner* — Yate' K Cutliff
(74) *Attorney, Agent, or Firm* — Foley & Lardner LLP

(57) ABSTRACT

The present technology provides a method that includes contacting a composition with a caustic solution to produce a caustic-treated composition; combining the caustic-treated composition with silica particles to produce a slurry; and removing the silica particles from the slurry to produce a treated composition; wherein the composition includes one or more of animal fats, animal oils, plant fats, plant oils, vegetable fats, vegetable oils, greases, and used cooking oil and the composition includes: at least about 10 wppm of total metals, at least about 8 wppm of phosphorus, at least about 10 wppm of chlorine, at least about 10 wppm of sulfur, at least about 20 wppm of nitrogen, at least about 5 wt. % of free fatty acids; and has an acid number from about 10 mg KOH/g to about 150 mg KOH/g, and the silica particles has a particle size from about 10 microns to about 50 microns, a BET surface area from about 200 m²/g to about 1000 m²/g.

20 Claims, 2 Drawing Sheets

(51) Int. Cl.
  *C11B 13/00* (2006.01)
  *C11B 3/04* (2006.01)
  *C11B 3/00* (2006.01)

(52) U.S. Cl.
  CPC ................ *C11B 3/10* (2013.01); *C11B 13/00* (2013.01); *C10G 2300/1011* (2013.01); *C10G 2300/1014* (2013.01); *C10G 2300/1018* (2013.01)

(56) References Cited

U.S. PATENT DOCUMENTS

| | | |
|---|---|---|
| 7,087,771 B2 | 8/2006 | Luxem et al. |
| 7,803,343 B2 * | 9/2010 | Hua ............... C01B 33/143 423/338 |
| 9,404,064 B2 | 8/2016 | Guay et al. |
| 9,957,464 B2 | 5/2018 | Slade et al. |
| 2005/0081436 A1 * | 4/2005 | Bertram ............ B01D 15/00 44/605 |
| 2016/0289578 A1 * | 10/2016 | Slade ............... C07C 67/02 |

* cited by examiner

METHOD FOR UPGRADING LOW-VALUE AND WASTE FATS, OILS, AND GREASES

CROSS-REFERENCE TO RELATED APPLICATIONS

This application claims the benefit of and priority to U.S. Provisional Patent Application No. 62/665,991, filed May 2, 2018, the contents of which are incorporated herein by reference in their entirety.

FIELD

The present technology relates generally to the processing of compositions that may be used as biorenewable feedstocks for hydroprocessing. More particularly, and not by way of limitation, the present technology provides a method for upgrading low-value and waste fat, oil, and grease compositions to produce treated compositions having reduced amounts of sediment, sulfur, nitrogen, chlorine, polymers, phosphorus, and total metals.

SUMMARY

In an aspect, a method is provided that includes contacting a composition with a caustic solution to produce a caustic-treated composition; combining the caustic-treated composition with silica particles to produce a slurry; and removing the silica particles from the slurry to produce a treated composition. The composition includes animal fats, animal oils, plant fats, plant oils, vegetable fats, vegetable oils, greases, used cooking oil, or a combination of any two or more thereof. Further, the composition includes at least about 10 wppm of total metals, at least about 8 wppm of phosphorus, at least about 10 wppm of chlorine, at least about 10 wppm of sulfur, at least about 20 wppm of nitrogen, at least about 5 wt. % of free fatty acids, and has an acid number from about 10 to about 150 mg KOH/g. The silica particles have an average particle size from about 10 microns to about 50 microns and a Brunauer-Emmett-Teller surface area ("BET surface area") from about 200 $m^2/g$ to about 1000 $m^2/g$.

DETAILED DESCRIPTION

Figure 1:
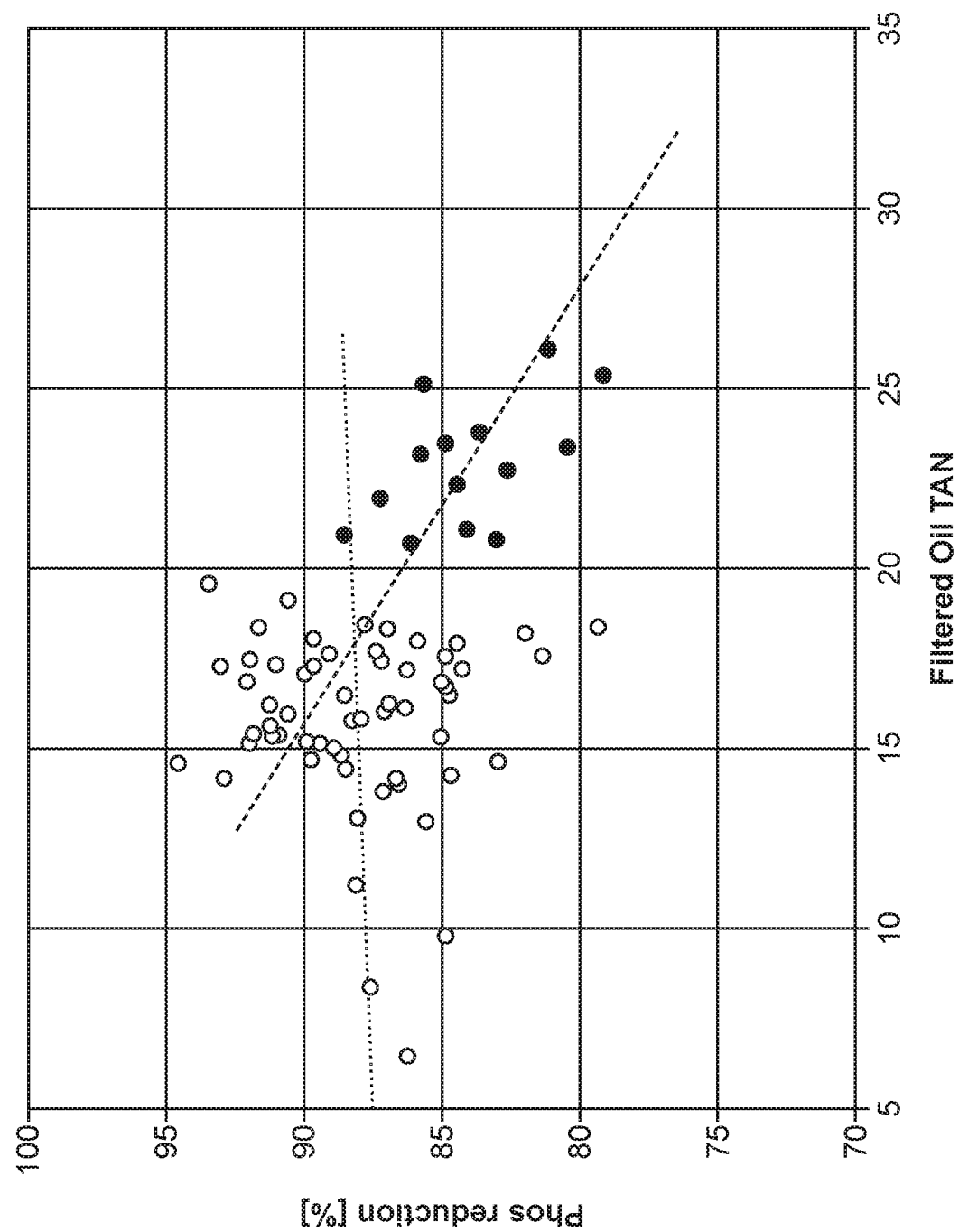
FIG. 1 illustrates percent reduction of phosphorus as a function of the total acid number ("TAN") of a raw fat, oils, and grease (FOG) feed according to a method of the present technology.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term—for example, "about 10 wt. %" would mean "9 wt. % to 11 wt. %". It is to be understood that when "about" precedes a term, the term is to be construed as disclosing "about" the term as well as the term without modification by "about"—for example, "about 10 wt. %" discloses "9 wt. % to 11 wt. %" as well as disclosing "10 wt. %."

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Decarboxylation (DCO) is understood to mean hydroprocessing of an organic molecule such that a carboxyl group is removed from the organic molecule to produce $CO_2$, as well as decarbonylation which results in the formation of CO.

Pyrolysis is understood to mean thermochemical decomposition of carbonaceous material with little to no diatomic oxygen or diatomic hydrogen present during the thermochemical reaction. The optional use of a catalyst in pyrolysis is typically referred to as catalytic cracking, which is encompassed by the term as pyrolysis, and is not be confused with hydrocracking.

Hydrotreating (HT) involves the removal of elements from IUPAC groups 13, 15, 16, and/or 17 of the Periodic Table from organic compounds. Hydrotreating may also include hydrodemetallization (HDM) reactions. Hydrotreating thus involves removal of heteroatoms such as oxygen, nitrogen, sulfur, and combinations of any two more thereof through hydroprocessing. For example, hydrodeoxygenation (HDO) is understood to mean removal of oxygen by a catalytic hydroprocessing reaction to produce water as a by-product; similarly, hydrodesulfurization (HDS) and hydrodenitrogenation (HDN) describe the respective removal of the indicated elements through hydroprocessing.

Hydrogenation involves the addition of hydrogen to an organic molecule without breaking the molecule into subunits. Addition of hydrogen to a carbon-carbon or carbon-oxygen double bond to produce single bonds are two non-limiting examples of hydrogenation. Partial hydrogenation and selective hydrogenation are terms used to refer to hydrogenation reactions that result in partial saturation of an unsaturated feedstock. For example, vegetable oils with a high percentage of polyunsaturated fatty acids (e.g., linoleic acid) may undergo partial hydrogenation to provide a hydroprocessed product wherein the polyunsaturated fatty acids are converted to mono-unsaturated fatty acids (e.g., oleic acid) without increasing the percentage of undesired saturated fatty acids (e.g., stearic acid). While hydrogenation is distinct from hydrotreatment, hydroisomerization, and hydrocracking, hydrogenation may occur amidst these other reactions.

Hydrocracking (HC) is understood to mean the breaking of a molecule's carbon-carbon bond to form at least two molecules in the presence of hydrogen. Such reactions typically undergo subsequent hydrogenation of the resulting double bond.

Hydroisomerization (HI) is defined as the skeletal rearrangement of carbon-carbon bonds in the presence of hydrogen to form an isomer. Hydrocracking is a competing reaction for most HI catalytic reactions and it is understood that the HC reaction pathway, as a minor reaction, is included in the use of the term HI. Hydrodewaxing (HDW) is a specific form of hydrocracking and hydroisomerization designed to improve the low temperature characteristics of a hydrocarbon fluid.

Hydrocarbonaceous is defined as being primarily composed of organic molecules containing carbon and hydrogen (i.e., hydrocarbon), but also include constituents of other organic molecules such as those comprised of atoms selected from IUPAC groups 13 through group 17 of the Periodic Table (e.g., boron, nitrogen, oxygen, phosphorus, sulfur, and/or halogens).

The Present Technology

Substitution of fossil fuels with biofuels reduces greenhouse gas emissions, which depends on the feedstock used for production of the biofuel. Low-value and waste fats, oils, and greases ("FOG"), unlike most vegetable oils, are inedible byproducts and waste streams from food processing industries and water treatment plants. For example, in production of renewable diesel, the lipid feed (with varying free fatty acid ("FFA") content) is converted to isoparaffinic hydrocarbons in hydroprocessing reactors. The hydroprocessing reactors are typically high pressure vessels packed with extrudate catalysts that are impregnated with hydrogenation metals (e.g., Ni, Mo, Co, W, Pd, and Pt).

However, FOG composition feeds typically include a number of unique contaminants that negatively impact its conversion into biofuels, such as phosphorus, IUPAC Group 1-12 metals (as phospholipids and soaps), organic chlorine, nitrogen, and sulfur compounds, and polymers, as well as combinations of any two or more thereof (collectively referred to herein as "FOG contaminants"). During hydroprocessing, FOG contaminants may cause deactivation of the catalysts, plugging of the catalyst bed, and/or corrosion of the reactor. For example, phosphorus and IUPAC Group 1-12 metals are known poisons for hydroprocessing catalysts, chlorine compounds may undergo hydrodechlorination to generate hydrochloric acid causing stress corrosion cracking of stainless steels, and polymers may precipitate within the catalyst bed causing deactivation and plugging. In addition, organic N and S compounds compete with oxygenates for catalyst hydrodeoxygenation sites, making their removal beneficial for HDO processes. Proteins present in FOG compositions contain both N and S. Some lipid components are also known to include nitrogen and sulfur atoms in their molecular structure.

Bleaching clays (e.g., Fuller's Earth, TONSIL®) are known to be effective in removing color bodies that contain nitrogen compounds (e.g., chlorophyll) and other polar species. However, at relatively high FFA concentrations in FOG composition feeds, (i.e., about 8 weight percent ("wt. %") or higher in a FOG composition), metals such as Mg, Fe, and Ca leach off of the clay and into the cleaned oil, further contaminating the FOG. While FFAs may be removed from FOG compositions by reaction with a caustic solution, such as sodium or potassium hydroxide, and centrifugation/filtration ("soap out"), removal of FFAs as soap stock translates to poor biofuel yield from FOG. Thus, there is a need for a process and system to upgrade FOG composition streams by removal of metals, S, N, Cl, and polymers without relying on the use of bleaching clays and while retaining the FFA content of the feed.

The present technology provides methods for upgrading FOG compositions that include metals, sulfur, nitrogen, phosphorus, and polymers, such that the treated composition produced has less metals, sulfur, nitrogen, phosphorus, chlorine, and polymers. Contrary to comparative methods for removing such components from FOG compositions, the present technology allows for the reduction of metals, sulfur, nitrogen, phosphorus, chlorine, and polymers while maintaining the weight percent of FFAs in the composition.

Thus, in an aspect, a method is provided that includes contacting a composition with a caustic solution to produce a caustic-treated composition; combining the caustic-treated composition with silica particles to produce a slurry; and removing the silica particles from the slurry to produce a treated composition. The composition includes animal fats, animal oils, plant fats, plant oils, vegetable fats, vegetable oils, greases, used cooking oil, or a combination of any two or more thereof. Further, the composition includes at least about 10 wppm of total metals, at least about 10 wppm of phosphorus, at least about 10 wppm of chlorine, at least about 10 wppm of sulfur, at least about 20 wppm of nitrogen, at least about 5 wt. % of free fatty acids, and has an acid number from about 10 mg KOH/g to about 150 mg KOH/g. The silica particles have an average particle size from about 10 microns to about 50 microns and a Brunauer-Emmett-Teller surface area ("BET surface area") from about 200 $m^2/g$ to about 1000 $m^2/g$.

In any embodiment herein, it may be that the treated composition is combined with silica particles ("a second set of silica particles," where such silica particles may be of any embodiment of the silica particles described herein) to produce a second slurry; and removing the second set of silica particles from the second slurry to produce a second treated composition. In any embodiment herein, the second treated composition may be combined with silica particles ("a third set of silica particles," where such silica particles may be of any embodiment of the silica particles described herein) to produce a third slurry; and subsequently removing the third set of silica particles from the third slurry to produce a third treated composition. Analogous steps may be employed in any embodiment herein to provide a fourth treated composition, a fifth treated composition, etc. For ease of reference in discussing the technology, "treated composition" shall refer collectively to the treated composition, the second treated composition, etc., with the understanding that each treated composition may independently be of any embodiment as described herein.

As disclosed above, the composition includes animal fats, animal oils, plant fats, plant oils, vegetable fats, vegetable oils, greases, used cooking oil, or a combination of any two or more thereof. Plant and/or vegetable oils may include, but are not limited to, babassu oil, carinata oil, soybean oil, inedible corn oil, canola oil, coconut oil, rapeseed oil, tall oil, tall oil fatty acid, palm oil, palm oil fatty acid distillate, palm sludge oil, jatropha oil, palm kernel oil, sunflower oil, castor oil, camelina oil, archaeal oil, and mixtures of any two or more thereof. These may be classified as crude, degummed, and RBD (refined, bleached, and deodorized) grade, depending on level of pretreatment and residual phosphorus and metals content. However, any of these grades may be used in the present technology. Animal fats and/or oils as used above may include, but is not limited to, inedible tallow, edible tallow, technical tallow, floatation tallow, lard, poultry fat (e.g., chicken fat), poultry oils, fish fat, fish oils, and mixtures thereof. Greases may include, but are not limited to, yellow grease, brown grease, used cooking oil, waste vegetable oils, restaurant greases, trap grease from municipalities such as water treatment facilities, and spent oils from industrial packaged food operations and mixtures of any two or more thereof. For example, in any embodiment herein, the composition may include yellow grease, brown grease, floatation grease, poultry fat, inedible corn oil, used cooking oil, inedible tallow, floatation tallow, palm sludge oil, or a mixture of any two or more thereof.

The composition may include at least 8 wppm of total metals as measured by Inductively Coupled Plasma (ICP) spectroscopic methods such as ICP-AES (atomic emission spectroscopy) and ICP-OES (optical emission spectroscopy), such as AOCS Recommended Practice Ca 17-01. Such metals may include, but are not limited to, As, Ca, Cr, Cu, Fe, K, Li, Mg, Mn, Na, Pb, Sr, Zn, or a combination of any two or more thereof. For example, in any embodiment herein, the total metals may include Ca, Fe, K, Mg, and Na. The amount of total metals present in the composition may include from about 10 wppm to about 1000 wppm total metals. Thus, the amount of total metals in the composition may be about 10 wppm, about 15 wppm, about 20 wppm, about 25 wppm, about 30 wppm, about 35 wppm, about 40 wppm, about 45 wppm, about 50 wppm, about 55 wppm, about 60 wppm, about 65 wppm, about 70 wppm, about 75 wppm, about 80 wppm, about 85 wppm, about 90 wppm, about 95 wppm, about 100 wppm, about 105 wppm, about 110 wppm, about 115 wppm, about 120 wppm, about 125 wppm, about 130 wppm, about 135 wppm, about 140 wppm, about 145 wppm, about 150 wppm, about 155 wppm, about 160 wppm, about 165 wppm, about 170 wppm, about 175 wppm, about 180 wppm, about 185 wppm, about 190 wppm, about 195 wppm, about 200 wppm, about 225 wppm, about 250 wppm, about 275 wppm, about 300 wppm, about 325 wppm, about 350 wppm, about 375 wppm, about 400 wppm, about 425 wppm, about 450 wppm, about 475 wppm, about 500 wppm, about 550 wppm, about 600 wppm, about 650 wppm, about 700 wppm, about 750 wppm, about 800 wppm, about 850 wppm, about 900 wppm, about 1000 wppm, or any range including and/or in between any two of these values; the amount of total metals in the composition may be 10 wppm, 15 wppm, 20 wppm, 25 wppm, 30 wppm, 35 wppm, 40 wppm, 45 wppm, 50 wppm, 55 wppm, 60 wppm, 65 wppm, 70 wppm, 75 wppm, 80 wppm, 85 wppm, 90 wppm, 95 wppm, 100 wppm, 105 wppm, 110 wppm, 115 wppm, 120 wppm, 125 wppm, 130 wppm, 135 wppm, 140 wppm, 145 wppm, 150 wppm, 155 wppm, 160 wppm, 165 wppm, 170 wppm, 175 wppm, 180 wppm, 185 wppm, 190 wppm, 195 wppm, 200 wppm, 225 wppm, 250 wppm, 275 wppm, 300 wppm, 325 wppm, 350 wppm, 375 wppm, 400 wppm, 425 wppm, 450 wppm, 475 wppm, 500 wppm, 550 wppm, 600 wppm, 650 wppm, 700 wppm, 750 wppm, 800 wppm, 850 wppm, 900 wppm, 1000 wppm, or any range including and/or in between any two of these values. For example, suitable amounts of total metals in the composition may be from about 10 wppm to about 1000 wppm, from 10 wppm to 1000 wppm, from about 10 wppm to about 800 wppm, from 10 wppm to 800 wppm, from about 10 wppm to about 600 ppm, from 10 wppm to 600 ppm, from about 10 ppm to about 400 wppm, from 10 ppm to 400 wppm, from about 10 wppm to about 200 wppm, from 10 wppm to 200 wppm, from about 10 wppm to about 100 wppm, from 10 wppm to 100 wppm, from about 10 wppm to about 50 wppm, or from 10 wppm to 50 wppm.

The composition may include at least about 8 wppm of phosphorus measured as elemental phosphorus. The amount of phosphorus in the composition may be about 8 wppm, about 10 wppm, about 15 wppm, about 20 wppm, about 25 wppm, about 30 wppm, about 35 wppm, about 40 wppm, about 45 wppm, about 50 wppm, about 55 wppm, about 60 wppm, about 65 wppm, about 70 wppm, about 75 wppm, about 80 wppm, about 85 wppm, about 90 wppm, about 95 wppm, about 100 wppm, about 110 wppm, about 120 wppm, about 130 wppm, about 150 wppm, about 170 wppm, about 190 wppm, about 200 wppm, about 300 wppm, about 400 wppm, about 500 wppm, about 600 wppm, about 700 wppm, about 800 wppm, or any range including and/or in between any two of these values or any range above any one of these values.

The composition may include at least about 10 wppm of chlorine measured as elemental chlorine (a Cl atom). The amount of chlorine may be about 10 wppm, about 11 wppm, about 12 wppm, about 13 wppm, about 14 wppm, about 15 wppm, about 16 wppm, about 17 wppm, about 18 wppm, about 19 wppm, about 20 wppm, about 25 wppm, about 30 wppm, about 35 wppm, about 40 wppm, about 45 wppm, about 50 wppm, about 55 wppm, about 60 wppm, about 65 wppm, about 70 wppm, about 75 wppm, about 80 wppm, about 85 wppm, about 90 wppm, about 95 wppm, about 100 wppm, or any range including and/or in between any two of these values or any range above any one of these values.

The composition may include at least about 10 wppm of sulfur measured as elemental sulfur, such as by AOAC method 923.01. The amount of sulfur may include, but is not limited to at least about 10 wppm, about 15 wppm, about 20 wppm, about 25 wppm, about 30 wppm, about 35 wppm, about 40 wppm, about 45 wppm, about 50 wppm, about 55 wppm, about 60 wppm, about 65 wppm, about 70 wppm, about 75 wppm, about 80 wppm, about 85 wppm, about 90 wppm, about 95 wppm, about 100 wppm, about 110 wppm, about 120 wppm, about 130 wppm, about 150 wppm, about 170 wppm, about 190 wppm, about 200 wppm, or any range including and/or in between two of these values or any range above any one of these values.

The composition may include at least about 10 wppm of nitrogen measured as elemental nitrogen such as by ASTM D4629-17. The amount of nitrogen may include, but is not limited to at least about 10 wppm, about 15 wppm, about 20 wppm, about 25 wppm, about 30 wppm, about 35 wppm, about 40 wppm, about 45 wppm, about 50 wppm, about 55 wppm, about 60 wppm, about 65 wppm, about 70 wppm, about 75 wppm, about 80 wppm, about 85 wppm, about 90 wppm, about 95 wppm, about 100 wppm, about 110 wppm, about 120 wppm, about 130 wppm, about 150 wppm, about 170 wppm, about 190 wppm, about 200 wppm, about 250 wppm, about 300 wppm, about 350 wppm, about 400 wppm, about 450 wppm, about 500 wppm, about 550 wppm, about 600 wppm, about 650 wppm, about 700 wppm, about 750 wppm, about 800 wppm, about 850 wppm, about 900 wppm, about 950 wppm, about 1000 wppm, about 1100 wppm, or any range including and/or in between any two of these values or any range above any one of these values.

The composition includes at least about 5 wt. % of FFAs based on the total weight of the composition as measured by standard analytical techniques such as AOCS Ca 5a-40. The amount of FFAs may be about 5 wt. %, about 6 wt. %, about 7 wt. %, about 8 wt. %, about 9 wt. %, about 10 wt. %, about 11 wt. %, about 12 wt. %, about 13 wt. %, about 14 wt. %, about 15 wt. %, about 16 wt. %, about 17 wt. %, about 18 wt. %, about 19 wt. %, about 20 wt. %, about 21 wt. %, about 22 wt. %, about 23 wt. %, about 24 wt. %, about 25 wt. %, about 30 wt. %, about 35 wt. %, about 40 wt. %, about 45 wt. %, about 50 wt. %, about 55 wt. %, about 60 wt. %, about 70 wt. %, about 75 wt. %, or any range including and/or in between any two of these values. For example, in any embodiment herein, the amount of FFAs in the composition may be from about 5 wt. % to about 15 wt. %. In any embodiment herein, the amount of FFAs in the composition may be from about 5 wt. % to about 10 wt. %.

The composition may have an acid number of about 10 mg KOH/g to about 150 mg KOH/g. Suitable acid number amounts may include, but are not limited to from about 10 mg KOH/g to about 150 mg KOH/g, about 10 mg KOH/g to about 100 mg KOH/g, about 10 mg KOH/g to about 50 mg KOH/g, about 10 mg KOH/g to about 25 mg KOH/g, about 10 mg KOH/g to about 20 mg KOH/g, about 10 mg KOH/g to about 15 mg KOH/g, and any range including and/or in between any two of these values and above any one of these values. For example, in any embodiment herein, the acid number of the composition may be from about 10 mg KOH/g to about 30 mg KOH/g. In another embodiments, the acid number of the composition may be from about 10 mg KOH/g to about 20 mg KOH/g.

The composition may further include polymers. Such polymers may be dissolved polymers, solubilized polymers, particulate polymers, or a mixture of any two or more thereof. Particulate polymers may have a weight average diameter from about 0.01 μm to about 1 millimeter (mm); thus, the particulate polymers may have a weight average diameter of about 0.01 μm, about 0.1 μm, about 1 μm, about 5 μm, about 10 μm, about 25 μm, about 50 μm, about 75 μm, about 80 μm, about 100 μm, about 200 μm, about 300 μm, about 500 μm, about 750 μm, about 1 mm, or any range including and/or in between any two of these values. The particular polymers may have a weight average diameter less than about 0.01 μm. The polymers may be synthetic or natural. A partial list of synthetic polymers is provided in Table 1.

TABLE 1

Examples of Polymers

| Abbrev. | Name |
|---|---|
| ABS | Acrylonitrile butadiene styrene rubber |
| ACM | Polyacrylate Rubber |
| AEM | Ethylene-acrylate Rubber |
| AU | Polyester Urethane |
| BIIR | Bromo Isobutylene Isoprene |
| BR | Polybutadiene |
| CIIR | Chloro Isobutylene Isoprene |
| CR | Polychloroprene |
| CSM | Chlorosulphonated Polyethylene |
| ECO | Epichlorohydrin |
| EP | Ethylene Propylene |
| EPDM | Ethylene Propylene Diene Monomer |
| EU | Polyether Urethane |
| FEPM | Tetrafluoroethylene/propylene rubbers |
| FFKM | Perfluorocarbon elastomers |
| FKM | Fluoroelastomer |
| FMQ | Fluoro Silicone |
| FPM | Fluorocarbon Rubber |
| HDPE | High density Polyethylene |
| HNBR | Hydrogenated Nitrile Butadiene |
| IR | Polyisoprene |
| IIR | Isobutylene Isoprene rubber |
| LDPE | Low density polyethylene |
| NBR | Acrylonitrile Butadiene |
| PE | Polyethylene |
| PIB | Polyisobutene |
| PP | Polypropylene |
| PS | Polystyrene |

TABLE 1-continued

Examples of Polymers

| Abbrev. | Name |
|---|---|
| PVC | Poly vinyl choloride |
| PVDC | Polyvinylidene chloride |
| PU | Polyurethane |
| SBR | Styrene Butadiene |
| SEBS | Styrene Ethylene Butylene Styrene Copolymer |
| SI | Polysiloxane |
| VMQ | Vinyl Methyl Silicone |
| XNBR | Acrylonitrile Butadiene Carboxy Monomer |
| XSBR | Styrene Butadiene Carboxy Monomer |
| YBPO | Thermoplastic Polyether-ester |
| YSBR | Styrene Butadiene Block Copolymer |
| YXSBR | Styrene Butadiene Carboxy Block Copolymer |
| — | Latex products |
| — | Synthetic rubbers |
| — | Natural rubbers |
| — | Neoprene |
| — | Chloroprene derivatives |
| — | Fluorinated Polymers |
| — | Polyesters |
| — | Polyamides |
| — | Polyacetals |

In any embodiment herein, the synthetic polymers may include acrylonitrile butadiene styrene thermoplastic, polyacrylate rubber, ethylene-acrylate rubber, polyester urethane, bromo isobutylene isoprene rubber, polybutadiene rubber, chloro isobutylene isoprene rubber, polychloroprene, chlorosulphonated polyethylene, epichlorohydrin, ethylene propylene rubber, ethylene propylene diene monomer, polyether urethane, tetrafluoroethylene/propylene rubbers, perfluorocarbon elastomers, fluoroelastomer, fluoro silicone, fluorocarbon rubber, high density polyethylene, hydrogenated nitrile butadiene, polyisoprene, isobutylene isoprene rubber, low density polyethylene, polyethylene terephthalate, ethylene vinyl acetate, acrylonitrile butadiene, polyethylene, polyisobutene, polypropylene, polystyrene, polyvinyl chloride, polyvinylidene chloride, polyurethane, styrene butadiene, styrene ethylene butylene styrene copolymer, polysiloxane, vinyl methyl silicone, acrylonitrile butadiene carboxy monomer, styrene butadiene carboxy monomer, thermoplastic polyether-ester, styrene butadiene block copolymer, styrene butadiene carboxy block copolymer, polyesters, polyamides, polyacetals, polylactic acid, or mixtures of any two or more thereof. For example, in any embodiment herein, the polymers may include, but are not limited to, polyethylene, chlorosulphonated polyethylene, low density polyethylene, high density polyethylene, polyethylene terephthalate, polylactic acid, or a combination of any two or more thereof. Natural polymers may include proteins, oligopeptides, polysaccharides, and lignins.

The amount of polymers in the composition may be about 0.05 wppm, about 0.1 wppm, about 0.5 wppm, about 0.1 wppm, about 5 wppm, about 10 wppm, about 15 wppm, about 20 wppm, about 25 wppm, about 30 wppm, about 35 wppm, about 40 wppm, about 45 wppm, about 50 wppm, about 55 wppm, about 60 wppm, about 65 wppm, about 70 wppm, about 75 wppm, about 80 wppm, about 85 wppm, about 90 wppm, about 95 wppm, about 100 wppm, about 105 wppm, about 110 wppm, about 115 wppm, about 120 wppm, about 125 wppm, about 130 wppm, about 135 wppm, about 140 wppm, about 145 wppm, about 150 wppm, about 155 wppm, about 160 wppm, about 165 wppm, about 170 wppm, about 175 wppm, about 180 wppm, about 185 wppm, about 190 wppm, about 195 wppm, about 200 wppm, about 225 wppm, about 250 wppm, about 275 wppm, about 300 wppm, about 325 wppm, about 350 wppm, about 375 wppm, about 400 wppm, about 425 wppm, about 450 wppm, about 475 wppm, about 500 wppm, about 550 wppm, about 600 wppm, about 650 wppm, about 700 wppm, about 750 wppm, about 800 wppm, about 850 wppm, about 900 wppm, about 1000 wppm, about 1500 wppm, about 2000 wppm, about 2500 wppm, about 3000 wppm, about 3500 wppm, about 4000 wppm, about 4500 wppm, about 5000 wppm, about 5000 wppm, about 5500 wppm, about 6000 wppm, about 6500 wppm, about 7000 wppm, about 7500 wppm, about 8000 wppm, about 8500 wppm, about 9000 wppm, about 9500 wppm, about 10,000 wppm, about 10,500 wppm, about 11,000 wppm, and any range including and/or in between any two of these values and above any one of these values. In any embodiment herein, it may be that the composition may include no detectable polymers. By "detectable" as used throughout herein is meant detection on commercially available detection instruments known in the art.

The composition may include about 15 mg or more sediment per 100 mL of composition. This determination of sediment is measured according to the method described in AOCS Ca 3d-02 with the exception that the method should be conducted at 65° C. as opposed to 20° C.

The composition may or may not undergo pretreatment prior to contacting the composition with the caustic solution. Such pretreatments may include, but are not limited to, FFA stripping, bleaching, deodorizing, water washing, glycerolysis, degumming, alkalinity reduction, or a combination of any two or more thereof. Glycerolysis typically involves reducing the amount of FFAs by reaction of the composition with glycerol, such as described in U.S. Pat. No. 7,087,771, incorporated herein by reference. Products of this reaction may include mono-glycerides, di-glycerides, tri-glycerides, or a mixture of two or more thereof. For example, a representative reaction for converting a FFA to mono-glyceride may be illustrated as follows:

As such, glycerolysis may reduce an FFA content to about 15 wt. % or less, such as a range of about 5 wt. % to about 15 wt. % (about 5 wt. %, about 6 wt. %, about 7 wt. %, about 8 wt. %, about 9 wt. %, about 10 wt. %, about 11 wt. %, about 12 wt. %, about 13 wt. %, about 14 wt. %, about 15 wt. %, or any range including and/or in between any two of these values). For example, in any embodiment of the present technology the FFA content may be reduced to about 10 wt. % or less prior to contacting the composition with the caustic solution by pretreating the composition (e.g., via glycerolysis); as another example, in any embodiment of the present technology the FFA content may be reduced to a value within the range of about 5 wt. % to about 10 wt. % prior to contacting the composition with the caustic solution by glycerolysis pretreating of the composition.

One type of degumming is acid degumming, which includes contacting the composition with concentrated aqueous acids prior to contacting the composition with the caustic solution. Exemplary acid degumming processes are described in U.S. Pat. No. 9,404,064, incorporated herein by reference. Exemplary acids may include phosphoric acid, citric acid, and maleic acid. Acid degumming may reduce metals such as calcium and magnesium as well as reduce phosphorus. Similarly, alkalinity reduction is typically performed by adding an acid (referring to any acid, such as citric acid) to a composition having high alkalinity. The acid has the effect of neutralizing soaps and/or chelating metal ions. Process equipment used for acid degumming and/or alkalinity reduction may include high shear mixers, recirculating mixers, decanter centrifuges, and/or disk stack centrifuges.

Thus, alkalinity reduction may reduce the concentration of metals in the composition, in particular Fe, Ca, K, and Na, prior to contacting the composition with caustic solution. In any embodiment herein, alkalinity reduction may include contacting the composition with steam to heat the composition to provide a steam-heated composition, combining the steam-heated composition with an acid (e.g., citric acid) to provide an acid-contacted composition, combining the acid-contacted composition with water and subsequently agitating to provide a mixture that includes homogeneously-dispersed droplets, and then separating a sludge phase, an aqueous phase, and an oil phase in a three-phase centrifuge, wherein the oil phase is a pretreated composition having a reduced total metals content and reduced alkalinity (in comparison to the composition). The steam-heated composition may be at a temperature of about 150° F. to about 200° F. The amount of acid (e.g., citric acid) combined with the steam-heated composition may be about 0.2 wt. % to about 10.0 wt. % (based on the composition mass). The amount of water combined with the acid-contacted composition may be about 0.2 wt. % to about 10.0 wt. % (based on the composition mass). Agitation may include use of an agitator, a recirculation loop, any other means of mixing, or a combination of any two or more thereof. The total time of the agitation (e.g., total mixing time) may be about 2 to about 90 minutes. The pretreated composition may include a reduced amount of metals based on the amount of total metals in the composition prior to alkalinity reduction. Alkalinity reduction may provide a total metals content that is about 40% to about 99% lower than the composition prior to such alkalinity reduction.

In any embodiment herein, the process may or may not include bleaching with bleaching clays. Bleaching typically involves contacting a degummed composition with adsorbent clay and filtering the spent clay through a pressure leaf filter. Bleaching clays (e.g., Fuller's Earth, TONSIL®) are known to be effective in removing color bodies that contain nitrogen compounds (e.g., chlorophyll) and other polar species. However, at the relatively high FFA concentrations typical of raw FOG compositions of the present technology, metals such as Fe, Mg, and Ca leach off of the clay and into the cleaned composition and further contaminate the composition.

The method of the present technology includes contacting the composition as described in any embodiment herein with a caustic solution to produce a caustic-treated composition. For example, in any embodiment herein, the caustic solution may include an aqueous hydroxide solution, aqueous bicarbonate solution, aqueous bisulfide solution, aqueous alkoxide solution (e.g., an aqueous methoxide solution), a basic resin dissolved and/or suspended in an aqueous solution, methoxide solution, or combinations of two or more thereof. In any embodiment herein, the caustic solution may include sodium hydroxide, potassium hydroxide, ammonium hydroxide, sodium bicarbonate, potassium bicarbonate, ammonium bisulfide, sodium methoxide, potassium methoxide, or a combination of any two or more thereof. For example, in any embodiment herein, the caustic solution may be an about 10% to about 50% by weight aqueous hydroxide solution.

In any embodiment herein, contacting the composition with the caustic solution may initially provide a first mixture, where producing the caustic-treated composition may include separating the caustic-treated composition from the first mixture. This separating step may include use of a disc-stack centrifuge, decanter centrifuge, and/or 3-phase centrifuge. Other methods, systems, and apparatus for separating the caustic-treated composition from the first mixture may be included. These include methods, systems, and apparatus such as settling tanks and are known to persons skilled in the art. The caustic-treated composition may include a reduced amount of phosphorus and total metals based on the amount of phosphorus and total metals in the composition prior to contacting with caustic solution. The net reduction in phosphorus and metals may each independently be about 60% to about 96% from the amount in the composition prior to contacting with caustic solution.

Separating the caustic-treated composition from the first mixture may also include producing an aqueous waste. The aqueous waste may have a pH below about 7.0. Suitable pH values for the composition may include, but are not limited to about 6.5, about 6.0, about 5.5, about 5.0, about 4.5, about 4.0, about 3.5, about 3.0, about 2.5, about 2.0, or any range including and/or in between any two of these values or any range below any one of these values. For example, in any embodiment herein, the aqueous waste may have a pH from about 3.5 to about 6.0, from about 4.0 to about 5.0, and any range including and/or in between any two of these values and below any one of these values.

Following contacting the composition with the caustic solution, the resultant caustic-treated composition is combined with silica particles to produce a slurry. The silica particles may have an average particle size via laser diffraction analysis from about 10 microns (µm) to about 50 microns. The average particle size via laser diffraction analysis of the silica particles may include, but is not limited to about 10 microns, about 11 microns, about 12 microns, about 13 microns, about 14 microns, about 15 microns, about 16 microns, about 17 microns, about 18 microns, about 19 microns, about 20 microns, about 21 microns, about 22 microns, about 23 microns, about 24 microns, about 25 microns, about 26 microns, about 27 microns, about 28 microns, about 29 microns, about 30 microns, about 35 microns, about 40 microns, about 45 microns, about 50 microns, and any range including and/or in between any two of these values and below any one of these values.

As noted above, the silica particles have a BET surface area from about 200 $m^2/g$ to about 1000 $m^2/g$. The BET surface area may be determined by several methods, including the method described in ASTM-D3663-03 (2008), incorporated herein by reference in its entirety for any and all purposes. The BET surface area of the silica particles may include, but is not limited to about 200 $m^2/g$, about 210 $m^2/g$, about 220 $m^2/g$, about 230 $m^2/g$, about 240 $m^2/g$, about 250 $m^2/g$, about 260 $m^2/g$, about 270 $m^2/g$, about 280 $m^2/g$, about 290 $m^2/g$, about 300 $m^2/g$, about 320 $m^2/g$, about 340 $m^2/g$, about 360 $m^2/g$, about 380 $m^2/g$, about 400 $m^2/g$, about 450 $m^2/g$, about 500 $m^2/g$, about 550 $m^2/g$, about 600 $m^2/g$, about 650 $m^2/g$, about 700 $m^2/g$, about 750 $m^2/g$, about 800 $m^2/g$, about 850 $m^2/g$, about 900 $m^2/g$, about 950 $m^2/g$, about 1000 $m^2/g$, or any range including and/or in between any two of these values.

The silica particles may include amorphous silica particles, where the amorphous silica particles may be synthetic amorphous silica, natural amorphous silica, or a combination thereof.

The silica particles may have an aqueous solution pH of about 2.0 to about 6.0 when present in an aqueous dispersion at 15 wt. %. Suitable aqueous solution pH values for the silica particles may include, but are not limited to about 2.0, about 2.5, about 3.0, about 3.5, about 4.0, about 4.5, about 5.0, about 5.5, about 6.0, or any range including and/or in between any two of these values. For example, in any embodiment herein, the silica particles may have an aqueous pH from about 2.0 to about 3.5, about 2.0 to about 3.0, about 2.5 to about 3.0, and any range including and/or in between any two of these values and below any one of these values.

The silica particles may also have a compacted bulk density of about 100 g/L to about 1000 g/L according to standard bulk density measurement techniques such as ASTM D6393-08 Test E. The compact density of the silica particles may include, but is not limited to about 100 g/L, about 200 g/L, about 300 g/L, about 400 g/L, about 500 g/L, about 600 g/L, about 700 g/L, about 800 g/L, about 900 g/L, about 1000 g/L, and any range including and/or in between any two of these values and below any one of these values. For example, in any embodiment herein, the silica particles may have a compacted bulk density of about 500 g/L.

The silica particles may be combined with the caustic-treated composition at about 0.1% (weight silica particles to weight of caustic-treated composition) to about 0.8%. The weight silica particles to weight of caustic-treated composition may be about 0.1% (w/w), about 0.15% (w/w), about 0.2% (w/w), about 0.25% (w/w), about 0.3% (w/w), about 0.35% (w/w), about 0.4% (w/w), about 0.45% (w/w), about 0.5% (w/w), about 0.55% (w/w), about 0.6% (w/w), about 0.65% (w/w), about 0.7% (w/w), about 0.75% (w/w), about 0.8% (w/w), or any range including and/or in between any two of these values. For example, in any embodiment herein, the weight silica particles to weight of caustic-treated composition may be from about 0.1% (w/w) to about 0.8% (w/w), about 0.2% (w/w) to about 0.6% (w/w), and about 0.3% (w/w) to about 0.4% (w/w).

The silica particles may be combined with the caustic-treated composition at a temperature from about 150° F. to about 200° F. The combining with silica particles may be conducted at temperatures including but not limited to about 150° F., about 155° F., about 160° F., about 165° F., about 170° F., about 175° F., about 180° F., about 185° F., about 190° F., about 195° F., about 200° F., or any range including and/or in between any two of these values. For example, in any embodiment herein, the temperature may be in the range of about 160° F. to about 190° F.; in any embodiment herein, the temperature may be in the range of about 175° F. to about 185° F.

The slurry obtained from combining the caustic-treated composition with the silica particles may be subjected to an absolute pressure of about 100 Torr to about 500 Torr to drive off moisture. The absolute pressure may include, but is not limited to about 100 Torr, about 150 Torr, about 200 Torr, about 250 Torr, about 300 Torr, about 350 Torr, about 400 Torr, about 450 Torr, about 500 Torr, or any range including and/or in between any two of these values.

The slurry obtained from combining the caustic-treated composition with the silica particles may include a residence time from about 10 min to about 90 min. Suitable residence times may include, but are not limited to about 10 min, about 11 min, about 12 min, about 13 min, about 14 min, about 15 min, about 16 min, about 17 min, about 18 min, about 19 min, about 20 min, about 25 min, about 30 min, about 35 min, about 40 min, about 45 min, about 50 min, about 55 min, about 60 min, about 65 min, about 70 min, about 75 min, about 80 min, about 85 min, about 90 min, or any range including and/or in between any two of these values. For example, in any embodiment herein, the residence time may be from about 20 min to about 50 min. The combining the caustic-treated composition with silica particles as described in any embodiment herein may be conducted in a continuous flow operation tank.

The method of the present technology may further include combining the slurry with diatomaceous earth (DE). DE may be combined with the slurry such that the weight ratio of DE to silica particles (DE:silica) is in the range of about 0.1:1 to about 1.5:1; thus, the weight ratio DE:silica for any embodiment herein may be about 0.1:1, about 0.2:1, about 0.3:1, about 0.4:1, about 0.5:1, about 0.6:1, about 0.7:1, about 0.8:1, about 0.9:1, about 1:1, about 1.1:1, about 1.2:1, about 1.3:1, about 1.4:1, about 1.5:1, or any range including and/or in between any two of these ratios.

Once the slurry is obtained from combining the caustic-treated composition with silica particles as described in any embodiment herein, the method of the present technology includes removing the silica particles from the slurry to produce the treated composition. Removing the silica particles from the slurry may include filtering the slurry with one or more filters. For example, in any embodiment herein, the one or more filters may include pressure filtration (such as a vertical- and/or horizontal-leaf filter), filter presses, cartridge filters, compression filters, membrane plate press, disc filters, drum filters, or a combination of any two or more thereof. The one or more filters may include filters pre-coated with DE, cellulose, perlite, or a combination of any two or more thereof. For example, in any embodiment herein, the one or more filters may include pressure leaf filters pre-coated with DE.

The treated composition may include reduced amounts of phosphorus, total metals, sulfur, nitrogen, and chlorine while maintaining the amount of FFA that was present in the composition described in any embodiment herein. The treated composition may include at least about 5 wt. % to about 10 wt. %. The amount of FFA in the treated composition may include, but is not limited to at least about 5 wt. %, about 6 wt. %, about 7 wt. %, about 8 wt. %, about 9 wt. %, about 10 wt. %, and any range including and/or in between any two of these values and above any one of these values.

The treated composition may have an acid number from about 10 mg KOH/g to about 150 mg KOH/g. Suitable acid number amounts may include, but are not limited to from about 10 mg KOH/g to about 150 mg KOH/g, about 10 mg KOH/g to about 100 mg KOH/g, about 10 mg KOH/g to about 50 mg KOH/g, about 10 mg KOH/g to about 25 mg KOH/g, about 10 mg KOH/g to about 20 mg KOH/g, about 10 mg KOH/g to about 15 mg KOH/g, and any range including and/or in between any two of these values and above any one of these values. For example, in any embodiment herein, the acid number of the treated composition may be from about 10 mg KOH/g to about 30 mg KOH/g; in any embodiment herein, the acid number of the treated composition may be from about 10 mg KOH/g to about 20 mg KOH/g. Representative acid numbers for the treated composition may include, but are not limited to, about 10 mg KOH/g, about 11 mg KOH/g, about 12 mg KOH/g, about 13 mg KOH/g, about 14 mg KOH/g, about 15 mg KOH/g, about 16 mg KOH/g, about 17 mg KOH/g, about 18 mg KOH/g, about 19 mg KOH/g, about 20 mg KOH/g, about 21 mg KOH/g, about 22 mg KOH/g, about 23 mg KOH/g, about 24 mg KOH/g, about 25 mg KOH/g, about 26 mg KOH/g, about 27 mg KOH/g, about 28 mg KOH/g, about 29 mg KOH/g, about 30 mg KOH/g or any range including and/or in between any two of these values.

The treated composition may include less than about 10 wppm of total metals. The amount of total metals in the treated composition may be about 9 wppm, about 8 wppm, about 7 wppm, about 6 wppm, about 5 wppm, about 4 wppm, about 3 wppm, about 2 wppm, about 1 wppm, about 0.9 wppm, about 0.8 wppm, about 0.7 wppm, about 0.6 wppm, about 0.5 wppm, about 0.4 wppm, about 0.3 wppm, about 0.2 wppm, about 0.1 wppm, or any range including and/or in between any two of these values or any range less than any one of these values. For example, in any embodiment herein, the amount of total metals in the treated composition may be less than about 5 wppm.

The treated composition may include less than about 5 wppm phosphorus. The amount of phosphorus in the treated composition may be about 4 wppm, about 3 wppm, about 2 wppm, about 1 wppm, about 0.9 wppm, about 0.8 wppm, about 0.7 wppm, about 0.6 wppm, about 0.5 wppm, about 0.4 wppm, about 0.3 wppm, about 0.2 wppm, about 0.1 wppm, or any range including and/or in between any two of these values or any range less than any one of these values.

The treated composition may include less than about 10 wppm chlorine. The amount of chlorine in the treated composition may be about 9 wppm, about 8 wppm, about 7 wppm, about 6 wppm, about 5 wppm, about 4 wppm, about 3 wppm, about 2 wppm, about 1 wppm, about 0.9 wppm, about 0.8 wppm, about 0.7 wppm, about 0.6 wppm, about 0.5 wppm, about 0.4 wppm, about 0.3 wppm, about 0.2 wppm, about 0.1 wppm, or any range including and/or in between any two of these values or any range less than any one of these values.

The treated composition may include less than about 5 wppm of sulfur. The amount of sulfur in the treated composition may be about 4 wppm, about 3 wppm, about 2 wppm, about 1 wppm, about 0.9 wppm, about 0.8 wppm, about 0.7 wppm, about 0.6 wppm, about 0.5 wppm, about 0.4 wppm, about 0.3 wppm, about 0.2 wppm, about 0.1 wppm, or any range including and/or in between any two of these values or any range less than any one of these values.

The treated composition may include less than about 100 wppm nitrogen. The amount of nitrogen in the treated composition may be about 95 wppm, about 90 wppm, about 85 wppm, about 80 wppm, about 75 wppm, about 70 wppm, about 65 wppm, about 60 wppm, about 50 wppm, about 45 wppm, about 40 wppm, about 35 wppm, about 30 wppm, about 25 wppm, about 20 wppm, about 15 wppm, about 10 wppm, about 5 wppm, about 1 wppm, or any range including and/or in between any two of these values or any range less than any one of these values.

The treated composition may include less than about 15 mg sediment per 100 mL of treated composition. Thus, the amount of sediment per 100 mL of treatment composition may be about 15 mg, about 14 mg, about 13 mg, about 12 mg, about 11 mg, about 10 mg, about 9 mg, about 8 mg, about 7 mg, about 6 mg, about 5 mg, about 4 mg, about 3 mg, about 2 mg, about 1 mg, about 0.1 mg, about 0.01 mg, or any range including and/or in between any two of these values, or less than any one of these values.

The method of the present technology may further include subjecting the treated composition to hydroprocessing. Hydroprocessing as used herein describes various types of catalytic reactions that occur in the presence of hydrogen without limitation. Examples of the most common hydroprocessing reactions may include, but are not limited to, hydrogenation, hydrodesulfurization (HDS), hydrodenitrogenation (HDN), hydrotreating (HT), hydrocracking (HC), aromatic saturation or hydrodearomatization (HDA), hydrodeoxygenation (HDO), decarboxylation (DCO), hydroisomerization (HI), hydrodewaxing (HDW), hydrodemetallization (HDM), decarbonylation, methanation, and reforming. Depending upon the type of catalyst, reactor configuration, reactor conditions, and feedstock composition, multiple reactions can take place that range from purely thermal (i.e., do not require a catalyst) to catalytic.

The present invention, thus generally described, will be understood more readily by reference to the following examples, which are provided by way of illustration and are not intended to be limiting of the present invention.

EXAMPLES

Comparative Example 1. Citric Acid Treated FOG (Acid Degumming)

A raw FOG blend comprising used cooking oil (UCO) and inedible corn oil (ICO) was analyzed for sulfur, nitrogen, and chlorine compounds. Table 2 summarizes the amounts of sulfur, nitrogen and chlorine in the raw FOG.

The raw FOG stream was combined with an aqueous citric acid solution at a rate of about 2% (wt. acid/wt. FOG) through a high-shear mixer. The high-shear mixer outlet stream flowed through a hold tank providing about 15 min residence time and centrifuged through three disc-stack centrifuges arranged in series. Steam condensate was used as wash water for the centrifuges. The water entered the third centrifuge, with the heavy phase therein flowing through to the second centrifuge and from there to the first, thereby being counter-current to the raw FOG/light phase flowing through the first, second, and third centrifuges. The water/heavy phase out of the first centrifuge had a pH of about 3.2-3.4. The light phase out of the third centrifuge was analyzed for sulfur, nitrogen, and chlorine. Table 1 illustrates the resultant amount of sulfur, nitrogen, and chlorine in the "treated FOG". As further illustrated in Table 1, this treatment method removed an insignificant amount of the organic sulfur and virtually none of the nitrogen and organic chlorine compounds from the raw FOG.

TABLE 2

Sulfur, Nitrogen, Chlorine, and FFA Analysis for Example 1

| Sample ID | Sulfur (wppm) | Nitrogen (wppm) | Total Chlorine (wppm) | Organic Chlorine (wppm) | FFA (wt. %) |
|---|---|---|---|---|---|
| Raw FOG | 13.0 | 28.1 | 11.4 | 5 max (a) | 7.0 (b) |
| Citric Acid treated FOG | 11.1 | 28.0 | 4.44 | 4.44 | 7.2 |

(a) After the test, it was determined that if samples are subjected to a water wash prior to total chlorine measurement, the value of chlorine drops by 60+%. This was used to estimate organic chloride.
(b) Acid number was measured by titration and divided by 2 to obtain % FFA.

Comparative Example 2. Aqueous/Citric Acid Treated (Acid Degumming) and Filtered FOG Having High Levels of Sulfur and Nitrogen A blend of low-value raw FOG feedstock was prepared using the blend components and amounts shown in Table 3.

TABLE 3

FOG Blend Components

| Component | Mass % |
|---|---|
| Poultry Fat | 46% |
| Yellow Grease | 18% |

TABLE 3-continued

FOG Blend Components

| Component | Mass % |
|---|---|
| Brown Grease | 18% |
| Floatation Grease | 9% |
| Prepared Foods | 9% |

Table 4 provides the physical properties and contaminant concentrations for the raw FOG blend for Comparative Example 2.

TABLE 4

Contaminant analysis of raw FOG feedstock

| Component | Amount |
|---|---|
| Raw Fog Feedstock | |
| Ash (wppm) | 1675 |
| Nitrogen (wppm) | 920 |
| Sulfur (wppm) | 69 |
| Specific Gravity | 0.912 |
| Viscosity at 100° C. (cSt) | 7.43 |
| Acid Number (mg KOH/g) | 94.7 |
| Inductively Coupled Plasma (ICP) Analysis (metals) | |
| Calcium (wppm) | 285 |
| Iron (wppm) | 67.3 |
| Potassium (wppm) | 117 |
| Magnesium (wppm) | 7.6 |
| Sodium (wppm) | 123 |
| Phosphorus (wppm) | 144 |

The raw FOG blend was filtered through a 10-micron bag filter, and subjected to two wash cycles with demineralized water by continuously contacting the two liquids through a mixing valve. A batch settling tank was used for separating the light phase (washed oil) from the heavy phase (dirty water). The water-washed FOG was then treated with a 10% citric acid solution (in water). The contaminant concentration of the treated FOG (final light phase) is presented in Table 5.

TABLE 5

| Component | Amount |
|---|---|
| Citric Acid Treated FOG | |
| Ash (wppm) | 67.2 |
| Nitrogen (wppm) | 1006 |
| Sulfur (wppm) | 111 |
| Acid Number (mg KOH/g) | 129 |
| Moisture (Karl Fisher; mass %) | 0.85% |
| Moisture and all Volatiles (mass %) | 1.30% |
| Insoluble impurities (mass %) | 0.04% |
| Unsaponifiables (mass %) | 1.03% |
| Peroxide value (mEq/kg) | <0.2 |
| Thermal stability (mEq/kg) | 2 |
| ICP Analysis (metals and phosphorus) | |
| Calcium (wppm) | 14.5 |
| Iron (wppm) | 6.57 |
| Potassium (wppm) | 3 |
| Magnesium (wppm) | 0.532 |
| Sodium (wppm) | 6.79 |
| Phosphorus (wppm) | 8.28 |

Tables 4 and 5 show reduction in phosphorus and metals as a result of aqueous/citric acid treatment, but illustrate essentially no reduction in nitrogen and sulfur occurred.

Example 1. Process for Upgrading FOG According to the Present Technology

A raw FOG stream comprising used cooking oil and fancy bleachable tallow was subjected to ICP analysis (Table 6). The raw FOG stream was mixed with aqueous citric acid solution at a rate of about 2% (wt. acid/wt. FOG), and centrifuged through three disc-stack centrifuges arranged in series. Steam condensate was used as wash water for the centrifuges. The water entered the third centrifuge, with the heavy phase therein entering the second centrifuge and from there to the first, thereby flowing counter-current to the FOG/light phase flowing through the first, second, and third centrifuges. A caustic solution (25% NaOH in water) was mixed with the heavy phase entering the second centrifuge. The flow rate of the caustic solution was controlled such that the heavy phase from the third centrifuge has a pH between 4 and 4.5.

The light phase from the third centrifuge was pumped to a continuous flow stirred slurry tank. Amorphous silica particles and diatomaceous earth (DE) were continuously metered to the slurry tank at a rate of 0.31% each (w/w FOG basis). The tank provided 30 min residence time for the slurry at a temperature of about 181-184° F. The slurry was then processed through a pressure leaf filter pre-coated with DE. The filtered FOG was sampled from a tank downstream and subjected to elemental analysis via ICP, as well as sulfur, nitrogen, and chlorine analysis.

TABLE 6

Elemental Analysis Results for raw, centrifuged, and Silica-treated/Filtered FOG

| Sample ID | Raw FOG (wppm) | Citric Acid Treated/Degumming (wppm) | Silica Treated (wppm) |
|---|---|---|---|
| As | 0.19 | 0.19 | 0.19 |
| B | 0.04 | 0.06 | 0.09 |
| Ca | 7.8 | 1.9 | 0.39 |
| Cr | 0.01 | 0.01 | 0.01 |
| Cu | 0.14 | 0.11 | 0.09 |
| Fe | 5.00 | 1.20 | 0.98 |
| K | 19.00 | 0.16 | 0.16 |
| Li | 0.01 | 0.01 | 0.01 |
| Mg | 1.90 | 0.12 | 0.04 |
| Mn | 0.08 | 0.02 | 0.01 |
| Na | 30.0 | 2.10 | 1.60 |
| Ni | 0.02 | 0.02 | 0.02 |
| P | 35.00 | 13.00 | 4.20 |
| Pb | 0.19 | 0.19 | 0.19 |
| Si | 1.90 | 2.10 | 1.40 |
| Sr | 0.04 | 0.01 | 0.01 |
| Zn | 0.10 | 0.05 | 0.03 |
| Total | 101.4 | 21.25 | 9.42 |

Table 7 summarizes the amount of sulfur, nitrogen, chlorine, and acid number/% FFA in the raw FOG.

TABLE 7

Sulfur, Nitrogen, Chlorine, and FFA Analysis for Raw and Silica Treated FOG

| Sample ID | Sulfur (wppm) | Nitrogen (wppm) | Organic Chlorine (wppm) | FFA (wt. %) |
|---|---|---|---|---|
| Raw FOG | 12.0 | 257 | 14 | 6 |
| Silica Treated FOG | 2.05 | 82.4 | 6.7 | 6 |

Table 6 shows improved removal of phosphorus and metals achieved through the process of the present technology over degumming (and Comparative Examples 1 and 2), which exhibited a reduction in phosphorus from 13 wppm to 4 wppm and a reduction of all ICP metals and non-metals from 21.2 wppm to 9.4 wppm.

Table 7 shows reductions of organic sulfur, nitrogen, and chlorine in the range of 82%, 67%, and 52%, respectively. By contrast, as illustrated by Comparative Examples 1 and 2, FOG degumming alone provided virtually no reduction in these components. In addition, the method of the present technology maintained the % FFAs despite treatment with a caustic solution, suggesting that there was no detectable loss of FFA as sodium soaps.

Example 2. Removal of Polymer from Polymer-Contaminated FOG According to the Present Technology The various inedible tallow and yellow grease shipments that comprised the raw FOG were measured for polymer content according to AOCS technique Ca 16-75 for dissolved polyethylene (PE). The raw FOG compositions were filtered through a standard wire mesh filter. The PE results ranged from below detection up to 11,000 ppm (1.1 wt. %). The mixed FOG composition feed was treated with citric acid and centrifuged according to the conditions of Example 1. The light phase from the third centrifuge was sampled periodically over several days of operation and tested for polymer according to the AOCS method for dissolved PE. The PE results for the various samples ranged from 50 to 80 ppm, suggesting that the degumming step alone did not remove the dissolved polymer.

The centrifuged FOG was further processed according to the silica-treatment step of Example 1. Silica-treated FOG exiting the leaf filter was sampled at the same time samples were taken from the centrifuge. There was no detectable PE in any of the silica-treated samples, where the FOG samples obtained after degumming alone showed 50-80 ppm PE (70 ppm average).

Example 3. Effect of Acid Number on FOG Upgrading Performance

Figure 2:
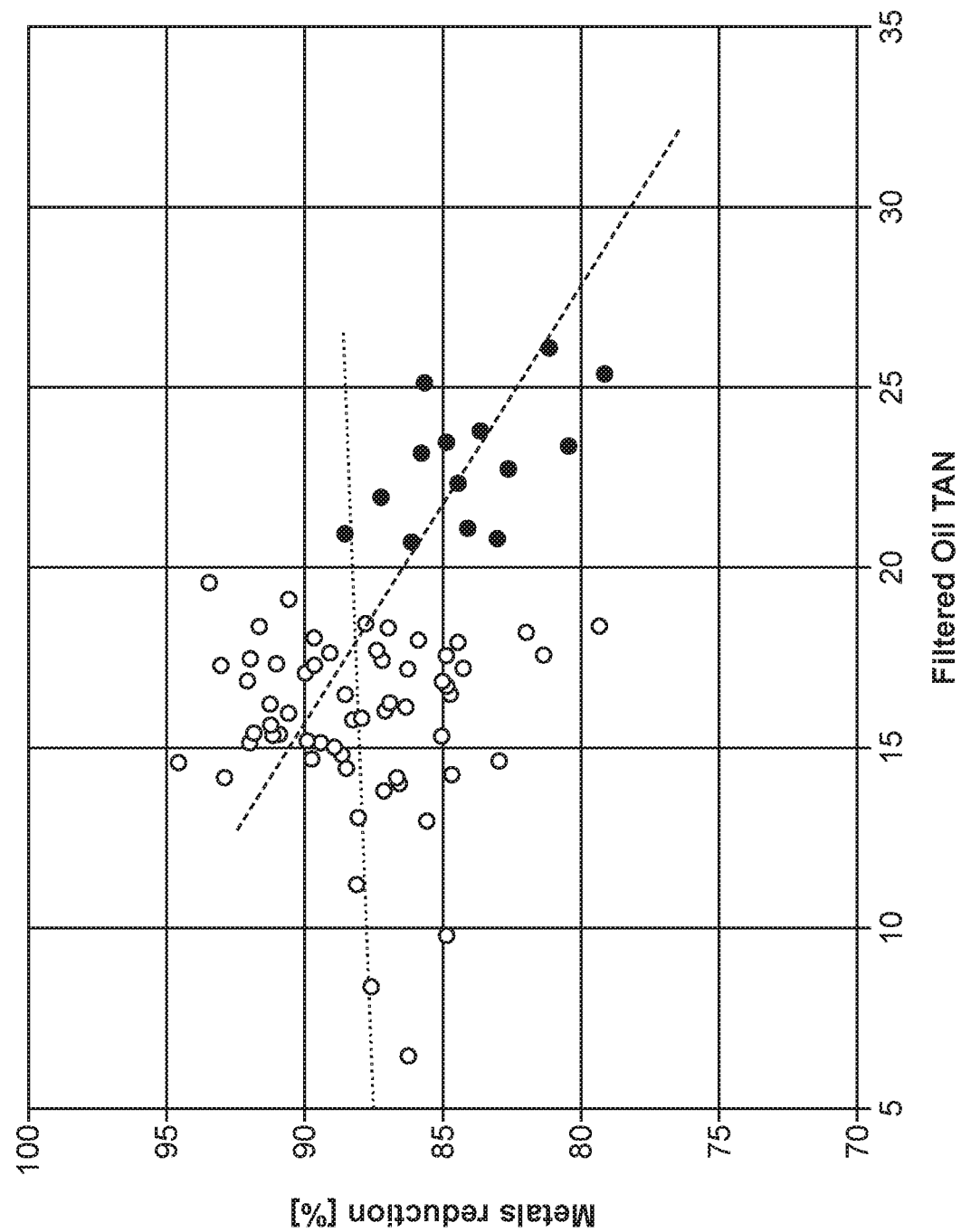
FIG. 2 illustrates percent reduction of metals as a function of the TAN of a raw FOG feed according to a method of the present technology.

The method of the present technology was evaluated over time for various low-value FOG composition feed blends. The performance was measured as % reduction in phosphorus and metals as a function of the raw feed acid number. Surprisingly, as observed in FIGS. 1 and 2, FOG acid number values below 20 mg KOH/g (10% FFA)—as illustrated by the open circles in FIGS. 1 and 2—exhibited up to 95% reduction in phosphorus and total metals following treatments according to the method of the present technology (Example 1). However, for values greater than 20 mg KOH/g (illustrated by the closed circles in FIGS. 1 and 2) a reduction in performance with increasing acid numbers was observed.

Example 4. Pretreatment of High-Alkalinity FOG

A raw FOG feedstock characterized by high alkalinity was processed through a preconditioning step to reduce alkalinity and remove excess metals. In this continuous preconditioning process, a brown grease stream was mixed with saturated steam at a rate of 5% brown grease mass basis and heated to approximately 80° C. Immediately after steam injection, a commercially available aqueous solution of 50% citric acid was added at a rate of 1 wt. % on a brown grease mass basis. The acid treatment had the purpose of neutralizing soaps and chelating metal ions. A mixing vessel with a mean residence time of 30-60 minutes was used to homogenize the mixture, ensuring full dispersion and contact of citric acid. The acidified water and oil mixture was pumped out of the mixing tank into a 3-phase centrifuge which removed insoluble salts and impurities as sludge. The 3-phase centrifuge provided continuous removal of solids and precipitates through the implementation of a scroll member that mechanically extracted solids out of the 2 liquid phases via an augering action. The 3-phase centrifuge was fine-tuned such that a portion of the light oil phase was also removed with the heavy phase, thereby insuring near-total removal of the heavy phase. Water-soluble salts, metals, and other water-soluble impurities were removed as part of the heavy aqueous phase. The light oil phase was recovered at greater than 95% yield on a bottoms fraction basis. Total alkalinity and impurity reductions of the oil across the pretreatment process are outlined in Table 8.

TABLE 8

|  | Initial Concentration (wppm) | Final Concentration (wppm) | % Reduction |
|---|---|---|---|
| Alkalinity | 15670 | 1860 | 88% |
| Ca | 292.7 | 3.1 | 99% |
| Fe | 300.4 | 30.0 | 90% |
| K | 790.6 | 17.2 | 98% |
| Mg | 12.5 | 0.3 | 98% |
| Mn | 1.9 | 0.1 | 98% |
| Na | 27.8 | 5.9 | 79% |
| P | 21.9 | 27.1 | −24% |
| Cl | 63.2 | 63.0 | 0% |
| Total | 2022.1 | 1176.8 | 42% |

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, or compositions, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present technology may include, but is not limited to, the features and combinations of features recited in the following lettered paragraphs, it being understood that the following paragraphs should not be interpreted as limiting the scope of the claims as appended hereto or mandating that all such features must necessarily be included in such claims:

A. A method comprising:
  contacting a composition with a caustic solution to produce a caustic-treated composition;
  combining the caustic-treated composition with silica particles to produce a slurry; and
  removing the silica particles from the slurry to produce a treated composition;
  wherein:
    the composition comprises:
      one or more of animal fats, animal oils, plant fats, plant oils, vegetable fats, vegetable oils, greases, and used cooking oil,
      at least about 10 wppm of total metals;
      at least about 8 wppm of phosphorus;
      at least about 10 wppm of chlorine;
      at least about 10 wppm of sulfur;
      at least about 20 wppm of nitrogen;
      at least about 5 wt. % of free fatty acids; and has an acid number from about 10 mg KOH/g to about 150 mg KOH/g; and the silica particles have an average particle size from about 10 microns to about 50 microns and a BET surface area from about 200 m²/g to about 1000 m²/g.

B. The method of Paragraph A, wherein the composition comprises animal fats, animal oils, plant fats, plant oils, vegetable fats, vegetable oils, greases, or a mixture of any two or more thereof.

C. The method of Paragraph A or Paragraph B, wherein the composition comprises yellow grease, brown grease, floatation grease, poultry fat, inedible corn oil, used cooking oil, inedible tallow, floatation tallow, palm sludge oil, or a mixture of any two or more thereof.

D. The method of any one of Paragraphs A-C, wherein the total metals comprise one or more members selected from the group consisting of As, Ca, Cr, Cu, Fe, K, Li, Mg, Mn, Na, Ni, Pb, Sr, and Zn.

E. The method of any one of Paragraphs A-D, wherein the composition further comprises from about 0.05 wppm to about 11,000 wppm of polymers.

F. The method of any one of Paragraphs A-E, wherein the composition has an acid number from about 10 mg KOH/g to about 50 mg KOH/g.

G. The method of any one of Paragraphs A-F, wherein the composition has an acid number from about 10 mg KOH/g to about 30 mg KOH/g.

H. The method of any one of Paragraphs A-G, wherein composition comprises about 5 wt. % to about 15 wt. % free fatty acids.

I. The method of any one of Paragraphs A-H, wherein prior to contacting the composition with the caustic solution, the composition undergoes a glycerolysis process to provide about 5 wt. % to about 15 wt. % free fatty acids in the composition.

J. The method of any one of Paragraphs A-I, wherein the method further comprises an acid-degumming step prior to contacting the composition with a caustic solution.

K. The method of any one of Paragraphs A-J, wherein the method further comprises an alkalinity reduction step prior to contacting the composition with a caustic solution.

L. The method of any one of Paragraphs A-K, wherein the method does not comprise contacting the composition with bleaching clays.

M. The method of any one of Paragraphs A-L, wherein the caustic solution comprises an aqueous ammonium hydroxide solution, aqueous potassium hydroxide solution, aqueous sodium hydroxide solution, or a combination of any two or more thereof.

N. The method of any one of Paragraphs A-M, wherein the silica particles comprise amorphous silica particles.

O. The method of any one of Paragraphs A-N, wherein the silica particles are combined with the caustic-treated composition about 0.1% (w/w) to about 0.8% (w/w) based on weight of the silica particles to weight of the caustic-treated composition.

P. The method of any one of Paragraphs A-O, wherein the silica particles have an aqueous solution pH of about 2.0 to about 6.0.

Q. The method of any one of Paragraphs A-P, wherein the combining with silica particles is conducted at a temperature from about 150° F. to about 200° F., and the slurry is subjected to an absolute pressure from about 100 Torr to about 500 Torr.

R. The method of any one of Paragraphs A-Q, wherein the combining with silica particles is conducted in a continuous flow operation tank.

S. The method of any one of Paragraphs A-R, wherein the combining with silica particles comprises a residence time from about 10 min to about 90 min.

T. The method of any one of Paragraphs A-S, wherein the method further comprises combining the slurry with diatomaceous earth (DE), wherein a weight ratio of DE to silica particles is from about 0.1:1 to about 1.5:1.

U. The method of any one of Paragraphs A-T, wherein the removing comprises filtering the slurry with one or more filters.

V. The method of claim U, wherein the one or more filters comprise pressure leaf filters, wherein the pressure leaf filters are optionally pre-coated with at least one or more of DE, cellulose, and perlite.

W. The method of any one of Paragraphs A-V, wherein the treated composition comprises:
at least about 5 wt. % to about 10 wt. % free fatty acids;
less than about 10 wppm of total metals;
less than about 5 wppm of phosphorus;
less than about 5 wppm of chlorine;
less than about 5 wppm of sulfur;
less than about 100 wppm of nitrogen; and
has an acid number from 10 mg KOH/g to about 20 mg KOH/g.

X. The method of any one of Paragraphs A-W, wherein the method further comprises hydroprocessing the treated composition.

Other embodiments are set forth in the following claims.

What is claimed is:

1. A method comprising:
contacting a composition with a caustic solution to produce a first mixture;
separating from the first mixture a caustic-treated composition and producing an aqueous waste with a pH from about 2.0 to about 5.0;
combining the caustic-treated composition with silica particles to produce a slurry; and
removing the silica particles from the slurry to produce a treated composition;
wherein:
the composition comprises:
one or more of animal fats, animal oils, plant fats, plant oils, vegetable fats, vegetable oils, greases, and used cooking oil,
at least 10 wppm of total metals;
at least 8 wppm of phosphorus;
at least 10 wppm of chlorine;
at least 10 wppm of sulfur;
at least 20 wppm of nitrogen;
at least 5 wt. % of free fatty acids; and
has an acid number from about 10 mg KOH/g to about 150 mg KOH/g;
the treated composition comprises:
a wt. % of free fatty acids about that of the composition; and
less total metals, phosphorus, sulfur, and nitrogen than the composition; and
the silica particles have an average particle size from about 10 microns to about 50 microns and a BET surface area from about 200 m²/g to about 1000 m²/g.

2. The method of claim 1, wherein the composition comprises yellow grease, brown grease, floatation grease, poultry fat, inedible corn oil, used cooking oil, inedible tallow, floatation tallow, palm sludge oil, or a mixture of any two or more thereof.

3. The method of claim 1, wherein the total metals comprise one or more members selected from the group consisting of As, Ca, Cr, Cu, Fe, K, Li, Mg, Mn, Na, Ni, Pb, Sr, and Zn.

4. The method of claim 1, wherein the composition has an acid number from about 10 mg KOH/g to about 50 mg KOH/g.

5. The method of claim 1, wherein composition comprises 5 wt. % to about 15 wt. % free fatty acids.

6. The method of claim 1, wherein prior to contacting the composition with the caustic solution, the composition undergoes a glycerolysis process to provide 5 wt. % to about 15 wt. % free fatty acids in the composition.

7. The method of claim 1, wherein the method further comprises an acid-degumming step prior to contacting the composition with a caustic solution.

8. The method of claim 1, wherein the method further comprises an alkalinity reduction step prior to contacting the composition with a caustic solution.

9. The method of claim 1, wherein the method does not comprise contacting the composition with bleaching clays.

10. The method of claim 1, wherein the caustic solution comprises an aqueous ammonium hydroxide solution, aqueous potassium hydroxide solution, aqueous sodium hydroxide solution, or a combination of any two or more thereof.

11. The method of claim 1, wherein the silica particles comprise amorphous silica particles.

12. The method of claim 1, wherein the silica particles are combined with the caustic-treated composition about 0.1% (w/w) to about 0.8% (w/w) based on weight of the silica particles to weight of the caustic-treated composition.

13. The method of claim 1, wherein the silica particles have an aqueous solution pH of about 2.0 to about 6.0.

14. The method of claim 1, wherein the combining with silica particles is conducted at a temperature from about 150° F. to about 200° F., and the slurry is subjected to an absolute pressure from about 100 Torr to about 500 Torr.

15. The method of claim 1, wherein the combining with silica particles is conducted in a continuous flow operation tank.

16. The method of claim 1, wherein the combining with silica particles comprises a residence time from about 10 min to about 90 min.

17. The method of claim 1, wherein the method further comprises combining the slurry with diatomaceous earth (DE), wherein a weight ratio of DE to silica particles is from about 0.1:1 to about 1.5:1.

18. The method of claim 1, wherein the removing comprises filtering the slurry with one or more filters.

19. The method of claim 18, wherein the one or more filters comprise pressure leaf filters, wherein the pressure leaf filters are optionally pre-coated with at least one or more of DE, cellulose, and perlite.

20. The method of claim 1, wherein the composition comprises 5 wt. % to about 10 wt. % free fatty acids; and the treated composition comprises:
less than 10 wppm of total metals;
less than 5 wppm of phosphorus;
less than 5 wppm of chlorine;
less than 5 wppm of sulfur;
less than 100 wppm of nitrogen; and
has an acid number from 10 mg KOH/g to about 20 mg KOH/g.

* * * * *

UNITED STATES PATENT AND TRADEMARK OFFICE
CERTIFICATE OF CORRECTION

| | |
|---|---|
| PATENT NO. | : 11,118,133 B2 |
| APPLICATION NO. | : 16/399728 |
| DATED | : September 14, 2021 |
| INVENTOR(S) | : Slade et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 72 days.

Signed and Sealed this
Fourteenth Day of February, 2023

Katherine Kelly Vidal
*Director of the United States Patent and Trademark Office*